United States Patent
Omura

(10) Patent No.: US 10,901,525 B2
(45) Date of Patent: Jan. 26, 2021

(54) IMAGE DISPLAY CONTROL DEVICE, IMAGE DISPLAY SYSTEM, AND COMPUTER PROGRAM PRODUCT

(71) Applicant: RICOH COMPANY, LTD., Tokyo (JP)

(72) Inventor: Katsuyuki Omura, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/629,446

(22) Filed: Jun. 21, 2017

(65) Prior Publication Data

US 2017/0285766 A1   Oct. 5, 2017

Related U.S. Application Data

(63) Continuation of application No. 13/688,617, filed on Nov. 29, 2012.

(30) Foreign Application Priority Data

Nov. 30, 2011  (JP) .................................. 2011-262619
Aug. 1, 2012  (JP) .................................. 2012-171108

(51) Int. Cl.
  *G06F 3/03*   (2006.01)
  *G06F 3/0354*  (2013.01)
  *G06F 3/042*  (2006.01)

(52) U.S. Cl.
  CPC .............. *G06F 3/03* (2013.01); *G06F 3/0304* (2013.01); *G06F 3/03545* (2013.01); *G06F 3/0428* (2013.01)

(58) Field of Classification Search
  CPC ............. G06F 3/03545; G06F 3/04883; G06F 3/0488; G06F 2203/04807; G06F 3/038;
(Continued)

(56) References Cited

U.S. PATENT DOCUMENTS 5,790,114 A * 8/1998 Geaghan ............... G06F 3/0488
                                                                178/18.03
6,100,877 A * 8/2000 Chery .................. G06F 3/03545
                                                                178/18.04
(Continued)

FOREIGN PATENT DOCUMENTS

JP          4-23026     1/1992
JP        H07-013676 A  1/1995
(Continued)

OTHER PUBLICATIONS

Office Action in Japanese Patent Application No. 2013-066402 dated Jul. 23, 2013.
(Continued)

*Primary Examiner* — Amare Mengistu
*Assistant Examiner* — Gloryvid Figueroa-Gibson
(74) *Attorney, Agent, or Firm* — Oblon, McClelland, Maier & Neustadt, L.L.P.

(57) ABSTRACT

An image display control device according to the present invention includes a display control unit, an obtaining unit, a drawing unit, a deleting unit, and an operating unit. The display control unit displays an image on a display device. The obtaining unit obtains contact position information or proximity position information of a drawing device, which is relative to a display area of the display device. The drawing unit generates a drawn image, compose a display image of an information processing apparatus with the drawn image, and displays the composite image on the display device. The deleting unit deletes the drawn image from the displayed image, and display on the display device. The operating unit operates the information processing apparatus. The drawing device switches and specifies a generation and deletion of the drawn image, and an operation of the information processing apparatus.

19 Claims, 7 Drawing Sheets

(58) Field of Classification Search
CPC ...... G06F 1/1639; G06F 3/0317; G06F 3/033;
G06F 3/03542; G06F 3/0383; G06F
3/0412; G06F 3/048; G06F 3/04817;
G06F 3/0482; G06F 3/03; G06F 3/0304;
G06F 3/0428; G06K 9/222; G06K 9/033;
Y10S 367/907
USPC .................................................. 345/179–183
See application file for complete search history.

(56) References Cited

U.S. PATENT DOCUMENTS

| | | | |
|---|---|---|---|
| 6,429,856 | B1 | 8/2002 | Omura et al. |
| 6,999,061 | B2 | 2/2006 | Hara et al. |
| 8,707,176 | B2 | 4/2014 | Muto et al. |
| 2003/0006973 | A1 | 1/2003 | Omura et al. |
| 2003/0080950 | A1* | 5/2003 | Chou ............... G06F 3/0488 345/179 |
| 2007/0257927 | A1* | 11/2007 | Sakanishi ............ G09G 5/005 345/581 |
| 2007/0288640 | A1 | 12/2007 | Schmieder |
| 2008/0270901 | A1* | 10/2008 | Muto .............. G11B 27/105 715/705 |
| 2009/0115744 | A1* | 5/2009 | Zhang .............. G06F 3/0346 345/179 |
| 2009/0273585 | A1 | 11/2009 | De Haan et al. |
| 2010/0106766 | A1 | 4/2010 | Bailey |
| 2011/0037711 | A1* | 2/2011 | Siddiqui ............ G06F 3/1423 345/173 |
| 2011/0107222 | A1 | 5/2011 | Uchida |
| 2011/0169756 | A1 | 7/2011 | Ogawa et al. |
| 2012/0062591 | A1 | 3/2012 | Omura et al. |
| 2012/0113029 | A1 | 5/2012 | Ye et al. |
| 2012/0249422 | A1* | 10/2012 | Tse .................. G06F 3/0304 345/158 |
| 2013/0069870 | A1* | 3/2013 | Ichieda ............... G06F 3/033 345/157 |
| 2013/0162953 | A1* | 6/2013 | Ding ................... G01S 5/20 353/15 |

FOREIGN PATENT DOCUMENTS

| | | |
|---|---|---|
| JP | 2000-20238 | 1/2000 |
| JP | 2002-091654 | 3/2002 |
| JP | 2004-94679 A | 3/2004 |
| JP | 2007-529064 A | 10/2007 |
| JP | 2008-275687 A | 11/2008 |
| JP | 2009-003575 A | 1/2009 |
| JP | 2009-86354 A | 4/2009 |
| JP | 2009-251394 A | 10/2009 |
| JP | 4627781 | 11/2010 |
| JP | 2011-143557 A | 7/2011 |
| JP | 2011-145763 A | 7/2011 |
| JP | 2011-232881 A | 11/2011 |
| JP | 2012-084122 | 4/2012 |
| WO | 2011/007288 A1 | 1/2011 |

OTHER PUBLICATIONS

Office Action dated Oct. 29, 2015, in co-pending U.S. Appl. No. 14/825,836, filed Aug. 13, 2015.
Office Action dated Apr. 26, 2016 in Japanese Patent Application No. 2012-171108.
Office Action dated Apr. 26, 2016 in Japanese Patent Application No. 2014-002060.
Japanese Office Action dated Sep. 20, 2316 in Patent Application No. 2012-171108.
Office Action dated Mar. 20, 2017 for corresponding U.S. Appl. No. 14/825,836.
Office Action dated Apr. 15, 2016, in co-pending U.S. Appl. No. 14/825,836, filed Aug. 13, 2015.
Office Action issued in corresponding U.S. Appl. No. 15/848,390 dated Apr. 29, 2018.
Office Action issued in corresponding Japanese Application No. 2017-043514 dated May 15, 2018.
Office Action dated Aug. 13, 2019 issued in corresponding Japanese Application No. 2018-209435.
Japanese Office Action dated Mar. 31, 2020 in Japanese Patent Application No. 2018-209435, 3 pages.

* cited by examiner

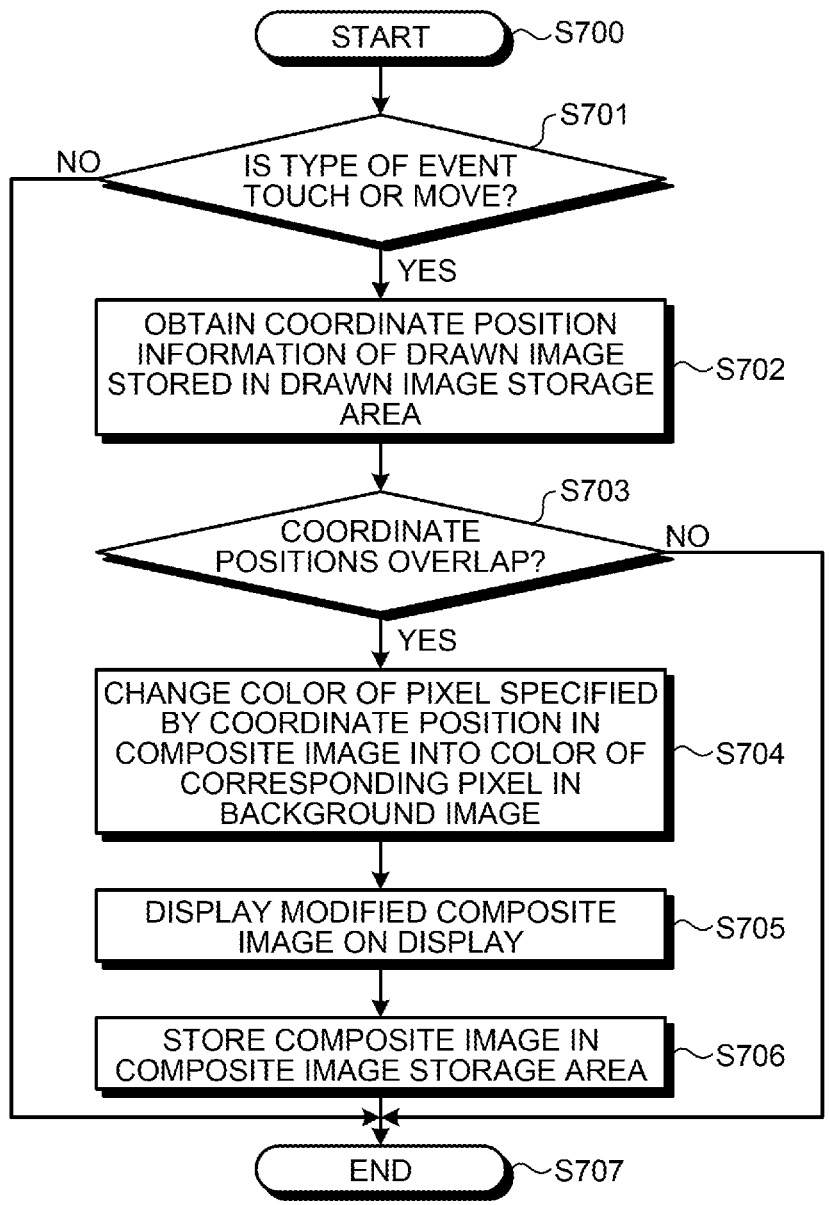

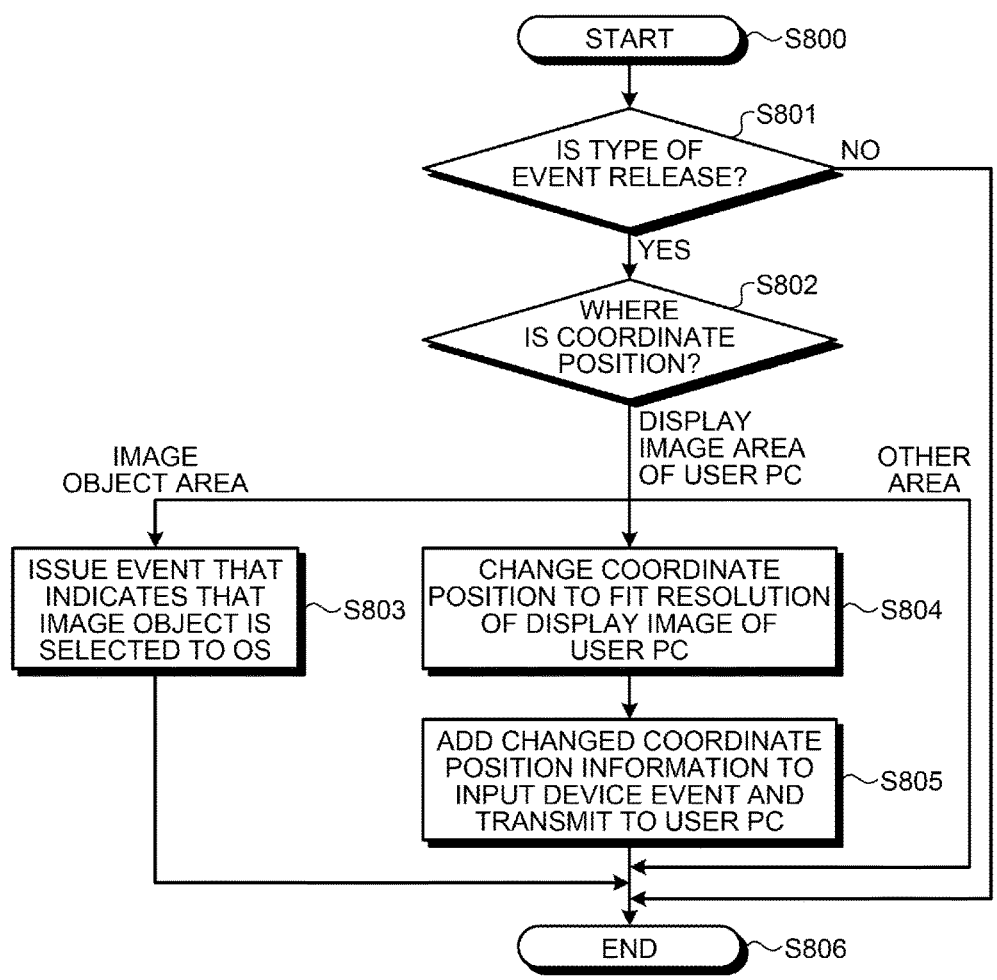

IMAGE DISPLAY CONTROL DEVICE, IMAGE DISPLAY SYSTEM, AND COMPUTER PROGRAM PRODUCT

CROSS-REFERENCE TO RELATED APPLICATIONS

The present application is a Continuation of U.S. patent application Ser. No. 13/688,617 filed Nov. 29, 2012, which claims priority to Japanese Patent Application No. 2011-262619, filed in Japan on Nov. 30, 2011, and Japanese Patent Application No. 2012-171108 filed, in Japan on Aug. 1, 2012, the contents of each of which are hereby incorporated by reference in their entirety.

BACKGROUND OF THE INVENTION

1. Field of the Invention

The present invention relates to an image display control device that displays arbitrary images. More specifically, the present invention relates to the image display control device, an image display system, and a computer program product having a program that display a display image of an information processing apparatus, allow operations of the information processing apparatus, and display any drawn image.

2. Description of the Related Art

A conventional electronic blackboard has been utilized for a meeting or a similar occasion in a company, an educational institution, an administrative agency, or a similar organization. The conventional electronic blackboard has a large display screen to display a display image of an information processing apparatus, and allows its operation.

As an example of the electronic blackboard, Japanese Patent Application Laid-open No. 2002-91654 discloses an information processing apparatus that is coupled to another information processing apparatus in order to display and control a screen of the information processing apparatus. This information processing apparatus has a first operational mode for operating this information processing apparatus and a second mode for operating the other information processing apparatus. These modes are switchable to operate these information processing apparatuses.

However, the information processing apparatus described in Japanese Patent Application Laid-open No. 2002-91654 has a problem that the apparatus is inadequate in its functioning of image-displaying and its usability.

There is need to provide an image display control device, an image display system, a method and a program that allow creating and deleting a drawn image and improving operability at the time of switching between functions provided by an image display control device.

SUMMARY OF THE INVENTION

It is an object of the present invention to at least partially solve the problems in the conventional technology.

An image display control device for displaying an image on a display device, comprises: a display control unit configured to display an image; an obtaining unit configured to obtain contact position information or proximity position information of a drawing device, the contact position information or proximity position information being relative to a display area of the display device; a drawing unit configured to use the contact position information or proximity position information to generate a drawn image, and compose a display image received from an external information processing apparatus with the drawn image, and display the composite image on the display device, the information processing apparatus providing the image display control device with an image; a deleting unit configured to use the contact position information or proximity position information to delete the drawn image from the image displayed on the display device, and display on the display device; and an operating unit configured to use the contact position information or proximity position information to operate the information processing apparatus.

In the image display control device, the drawing device includes a switching unit configured to specify a generation of the drawn image, a deletion of the drawn image, and an operation of the information processing apparatus, the switching unit includes two buttons to be pressed by a user, and the image display control device selectively generates the drawn image, deletes the drawn image, and operates the information processing apparatus based on a designation by the drawing device.

A computer program product comprises a non-transitory computer-usable medium having a program for executing a method executed by an image display control device for displaying an image on a display device.

In the computer program product, the method includes: receiving a command from a drawing device configured to specify a generation of a drawn image, a deletion of a drawn image, and an operation of an information processing apparatus configured to provide the image display control device with an image; obtaining contact position information or proximity position information of the drawing device, the contact position information or proximity position information being relative to a display area of the display device; using the contact position information or proximity position information to generate a drawn image, composing a display image of the information processing apparatus with the drawn image, and displaying on the display device; using the contact position information or proximity position information to delete the drawn image from an image displayed on the display device, and display on the display device; and using the contact position information or proximity position information to operate the information processing apparatus.

In the method in the program included in the computer program product, the drawing device includes a switching unit configured to specify a generation of the drawn image, a deletion of the drawn image, and an operation of the information processing apparatus, the switching unit includes two buttons to be pressed by a user, and the image display control device selectively generates the drawn image, deletes the drawn image, and operates the information processing apparatus based on a designation by the drawing device.

An image display system comprises: a display device; an image display control device configured to display an image on the display device; an information processing apparatus configured to provide the image display control device with an image; a drawing device configured to generate a drawn image; and a coordinate sensor configured to sense contact position information or proximity position information of the drawing device.

In the image display system, the image display control device comprises: a display control unit configured to display an image; an obtaining unit configured to obtain contact position information or proximity position information of the drawing device from the coordinate sensor, the contact position information or proximity position information being relative to a display area of the display device; a drawing unit configured to use the contact position information or proximity position information to generate a drawn image, and compose a display image received from the information processing apparatus with the drawn image, and display on the display device; a deleting unit configured to use the contact position information or proximity position information to delete the drawn image from the image displayed on the display device, and display on the display device; and an operating unit configured to use the contact position information or proximity position information to operate the information processing apparatus. And, in the image display control device, the drawing device includes a switching unit configured to specify a generation of the drawn image, a deletion of the drawn image, and an operation of the information processing apparatus, the switching unit includes two buttons to be pressed by a user, and the image display control device selectively generates the drawn image, deletes the drawn image, and operates the information processing apparatus based on a designation on the drawing device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a flowchart illustrating a process executed by a controller included in the image display device according to the embodiment of the present invention, in the case where a deletion mode is selected; and FIG. 8 is a flowchart illustrating a process executed by a controller included in the image display device according to the embodiment of the present invention, in the case where a selection mode is selected.

DETAILED DESCRIPTION OF THE PREFERRED EMBODIMENTS

The following describes an embodiment of the present invention. However, the present invention is not limited to the embodiment described below.

Figure 1:
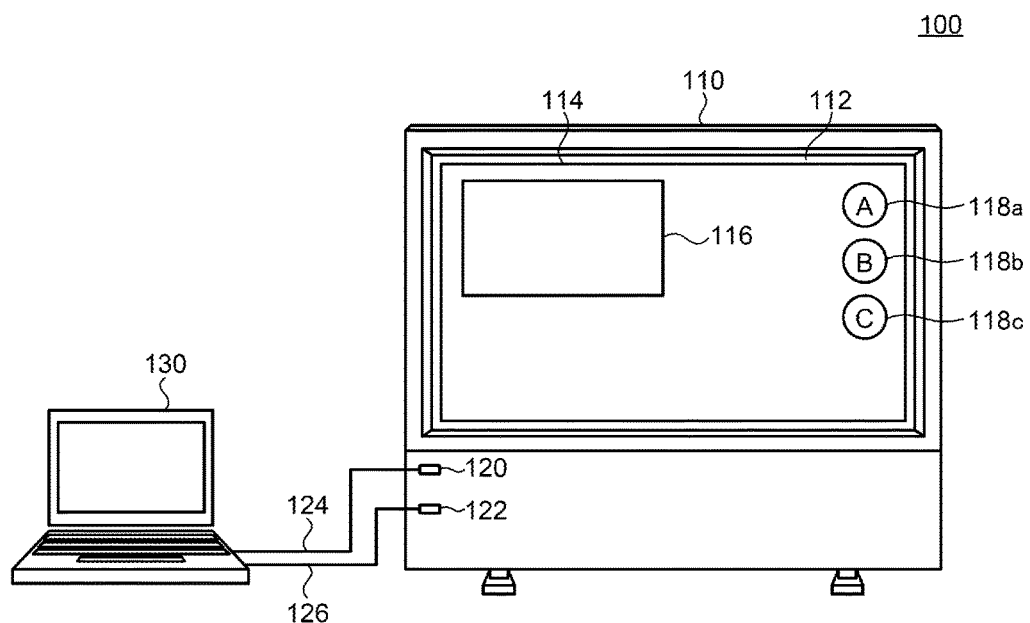
FIG. 1 is a block diagram illustrating an image display system according to an embodiment of the present invention.

FIG. 1 is a block diagram illustrating an image display system 100 according to the present invention. The image display system 100 includes an image display device 110 and a user PC 130. The image display device 110 is coupled to the user PC 130 via cables 124 and 126.

The image display device 110 is a device that displays a display image of the user PC 130 and allows its operation. The image display device 110 also displays a drawn image created by the user. The image display device 110 includes a display 112, a video input interface 120, and an output interface 122.

The display 112 is a display unit that displays various kinds of images such as a display image of the user PC 130 and a drawn image created by the user. The display 112 displays GUI (Graphical User Interface) buttons 118a, 118b, and 118c, which are used to operate a display image 116 of the user PC 130 and the image display device 110. The display 112 includes a coordinate sensor 114 as sensing means that senses a contact and proximity of an object such as a finger and a dedicated pen.

The video input interface 120 is an interface that receives a video signal that forms a display image 116 of the user PC 130. In this embodiment, a DVI connector, which has a DVI (Digital Visual Interface) terminal, may be employed as the video input interface 120. The video input interface 120 receives a VGA signal from the user PC 130 via the cable 124 such as a VGA cable, and provides the image display device 110 with the VGA signal.

In other embodiments, a VGA (Video Graphics Array) connector, an HDMI (High-Definition Multimedia Interface) connector, a DisplayPort connector, or other connectors may be employed. Additionally, the video input interface 120 may employ a wireless communication that is compliant with a wireless communication protocol such as Bluetooth (registered trademark) and Wi-Fi in order to receive the video signal from the user PC 130 in other embodiments.

The output interface 122 is a physical interface that outputs an event of operating a display image of the image display device 110 and the user PC 130. In this embodiment, a USB socket may be employed as the output interface 122.

The user PC 130 is an information processing apparatus that provides an image to be displayed on the image display device 110. The user PC 130 includes an interface that outputs a video signal. The user PC 130 provides the image display device 110 with the video signal that forms an image displayed in a display screen of the user PC 130, at a predetermined rate (for example, 50 to 60 fps (frame per second)). In this embodiment, the user PC 130 includes a VGA output terminal as an interface, and is able to transmit a VGA signal to the image display device 110. In other embodiment, the user PC 130 may employ a wireless communication that is compliant with various wireless communication protocols in order to transmit a display image.

The user PC 130 also includes USB ports. Through the USB ports, the user PC 130 receives signals that form various kinds of events (hereinafter referred to as "input device event"), which are issued by an input device such as a computer mouse and a keyboard, from the image display device 110. Then the user PC 130 executes processes in accordance with the input device event.

In the embodiment illustrated in FIG. 1, a note PC is employed as the user PC 130. In other embodiments, an information processing apparatus that is able to provide a video signal, such as a desktop PC, a tablet PC, and a PDA, may be employed.

Figure 2:
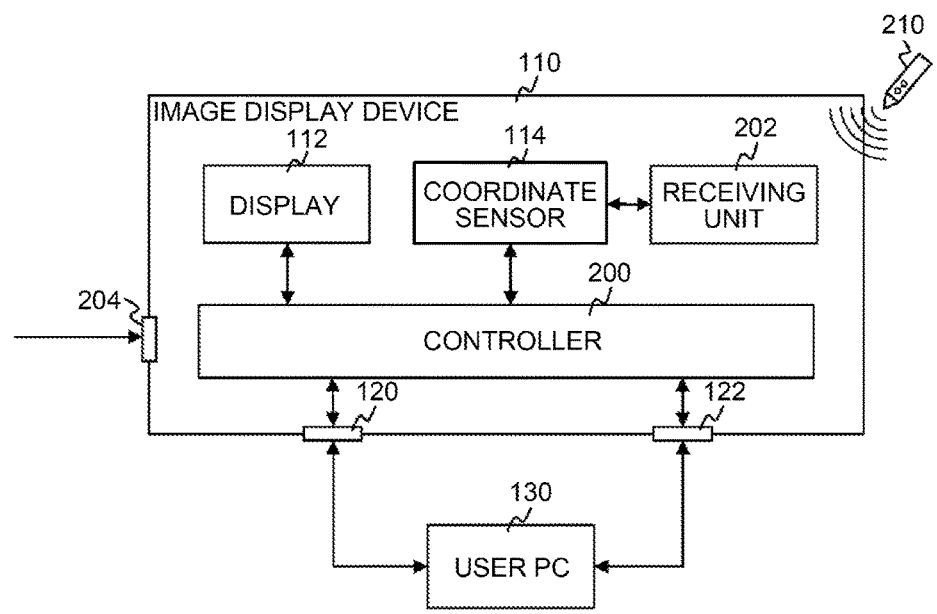
FIG. 2 is a block diagram illustrating a hardware configuration of an image display device according to the embodiment of the present invention.

FIG. 2 is a block diagram illustrating a hardware configuration of the image display device 110 according to the present invention. The image display device 110 is configured to include a controller 200, a receiving unit 202, the display 112, and the coordinate sensor 114.

The controller 200 is an image display control device that controls the entire image display device. The controller 200 may employ a LSI (Large Scale Integration). A functional configuration of the controller 200 will be described in detail by referring to FIG. 4.

The receiving unit 202 is functional means that receives a wireless signal from a drawing device 210. The drawing device 210 includes a mode switching unit that allows creation of a drawn image, deletion of the drawn image, and selection of an image object such as a GUI button displayed on the display 112. The drawing device 210 senses itself in contact with the display area of the display 112, which is a display unit of the image display device 110, and wirelessly transmits a signal that indicates its contact (hereinafter referred to as "a contact signal") to the image display device 110. The receiving unit 202 transmits the contact signal to the coordinate sensor 114.

This embodiment employs a coordinate input/sensing unit, which is an infrared light cut-off type as disclosed in Japanese Patent No. 4627781, as the coordinate sensor 114. In this coordinate input/sensing unit, two light sensing and emitting units are disposed at the both lower ends of the display 112. The two light sensing and emitting units emit a plurality of infrared lights in parallel with the display 112, and sense a light reflected in the same optical path by a reflection member disposed in a peripheral area of the display 112. The coordinate sensor 114 notifies identification information of the infrared lights that are emitted by the two light sensing and emitting units and then interrupted by the drawing device 210, to a coordinate sensor driver included in the controller 200. The coordinate sensor driver uses the identification information of the infrared light to specify an interrupted infrared light, and calculates a contact position or a proximity position (hereinafter referred to as "a coordinate position") of the drawing device 210.

In other embodiments, various kinds of sensing means may be employed. For example, a capacitive coordinate sensor where the contact position information is specified by sensing change in capacitance, a resistive coordinate sensor where the contact position information is specified by change in voltages of two opposing resistance films, or an electromagnetic induction type coordinate sensor where the contact position information is specified by sensing electromagnetic induction that is generated when a contact object contacts a display, may be employed.

The image display device 110 includes a network interface 204. Through the network interface 204, the image display device 110 is able to transmit image data of a display image, a drawn image, and a similar image on the display 112 via a network.

Figure 3:
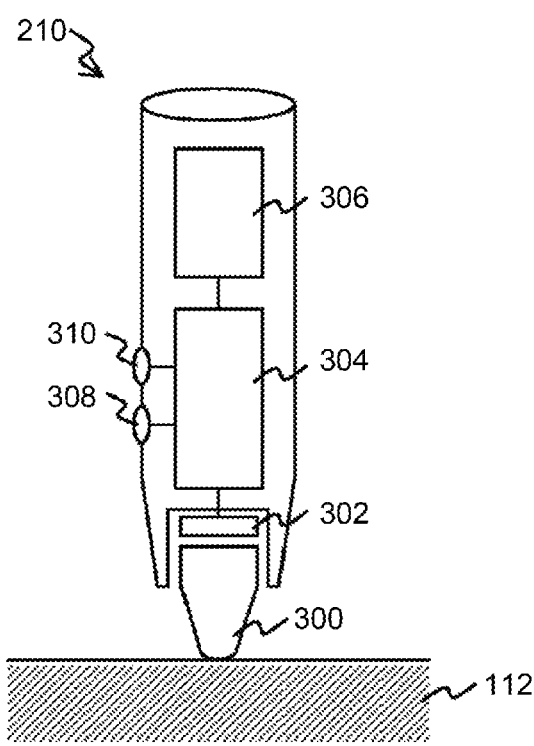
FIG. 3 is a block diagram illustrating a hardware configuration of a drawing device according to the embodiment of the present invention.

FIG. 3 is a block diagram illustrating a hardware configuration of the drawing device according to the present invention. The following describes a hardware configuration of the drawing device 210.

The drawing device 210 includes a leading end unit 300, a contact sensor 302, a signal processing unit 304, and a signal transmitting unit 306, which constitute contact sensing means, and mode switching units 308 and 310.

The leading end unit 300 is a movable member to contact the display 112. When the leading end of the leading end unit 300 contacts the display 112, the leading end unit 300 moves to the longer side direction of the drawing device 210 while the trailing end contacts the contact sensor 302. An elastic member (not illustrated) such as a spring is disposed between the leading end unit 300 and the contact sensor 302. When the leading end unit 300 is separated from the coordinate sensor 114, the leading end unit 300 returns to the original position due to an elastic force of the elastic member.

The contact sensor 302 is a sensor that senses a contact of the leading end unit 300. In this embodiment, a pressure sensor such as FlexiForce (trademark) of NITTA CORPORATION and INASTOMER (registered trademark) of INABA RUBBER CO., LTD may be employed as the contact sensor 302. When the leading end unit 300 contacts the contact sensor 302, the resistance value of the current in the contact sensor 302 changes.

The signal processing unit 304 is means that monitors the contact sensor 302 and determines whether or not the drawing device 210 contacts. In this embodiment, a semiconductor circuit may be employed as the signal processing unit 304. The signal processing unit 304 is configured to include a voltage converter circuit, an A/D converter circuit, a memory circuit, a determination circuit, and an output circuit.

When the signal processing unit 304 senses a change in the resistance value of the contact sensor 302, the voltage converter circuit converts the change in the resistance value of the contact sensor 302 into a voltage, and the A/D converter circuit converts the voltage converted by the voltage converter circuit into a contact signal, which is a digital value.

The determination circuit compares the contact signal with a predetermined threshold value stored in the memory circuit in order to determine whether or not the leading end unit 300 contacts the display 112, and then transmits the determination result to the output circuit.

In this embodiment, a value obtained by converting a change in resistance value, which is generated when the leading end unit 300 actually contacts the display 112, into a voltage and converting this voltage into a digital value, may be defined as the predetermined threshold value. In the case where the change in resistance value is equal to or more than the predetermined threshold value, it is determined that the leading end unit 300 contacts the display 112. On the other hand, in the case where the change in resistance value is less than the predetermined threshold value, it is determined that the leading end unit 300 does not contact the display 112.

The determination circuit also senses a press on the mode switching units 308 and 310, which are means that switches between operational modes, and then transmits a signal (hereinafter referred to as "a switching unit type signal"), which indicates the type of the mode switching unit pressed by the user, to the output circuit. The mode switching units 308 and 310 have a mechanism to select a drawing mode, a deletion mode, or a selection mode, which are offered by the image display device 110. The drawing mode allows a user to create a drawn image. The deletion mode allows a user to delete the created drawn image. In the selection mode, an image object such as a GUI button, which is displayed on the display 112, is allowed to be selected, and an event is allowed to be transmitted to the user PC 130.

In this embodiment, the mode switching unit 308, which is the first button, may select the deletion mode, and the mode switching unit 310, which is the second button, may select the selection mode. In this embodiment, the two mode switching units are used to select the mode, one mode switching unit or three mode switching units may be used to select the mode in other embodiments.

When a user presses the mode switching unit 308 or 310, the mode switching unit 308 or 310 transmits a switching unit type signal to the output circuit via a signal line.

The output circuit outputs the contact signal and the switching unit type signal, which are output from the determination circuit, to the signal transmitting unit 306. The contact signal includes a value that indicates that the drawing device 210 is in contact with the display 112 (true), and a value that indicates that the drawing device 210 is not in contact with the display 112 (false). The output circuit regularly outputs the contact signal and the switching unit type signal. In other embodiments, the output circuit may output the contact signal when the drawing device 210 contacts the display 112, or the drawing device 210 is separated off the display 112.

The signal transmitting unit 306 is means that transmits the contact signal and the switching unit type signal, which are output by the output circuit, to the image display device 110. In this embodiment, the signal transmitting unit 306 transmits the contact signal and the switching unit type signal to the image display device 110 using a wireless communication such as an infrared light and Bluetooth (registered trademark). In other embodiments, these signals may be transmitted to the image display device 110 via a signal line.

In this embodiment, the operational mode may be switched by the drawing device 210. For example, while a user is creating the drawn image with the drawing device 210, the user may use the drawing device 210 in the user's hand in order to switch the operational mode to the deletion mode to delete the drawn image. Then the user may switch the operational mode to the drawing mode in order to continue to create a drawn image. This leads to higher usability.

Figure 4:
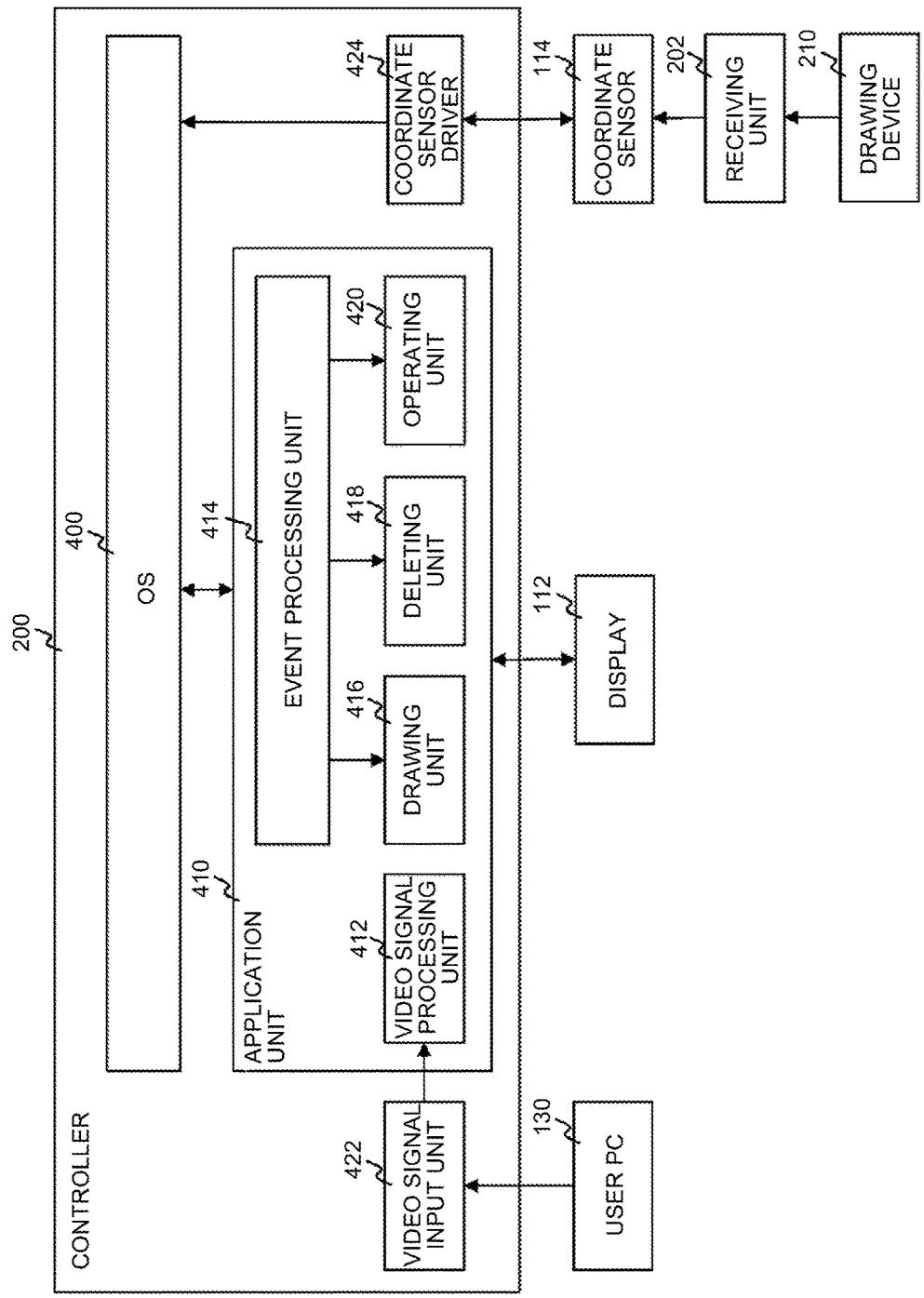
FIG. 4 is a block diagram illustrating a functional configuration of a controller included in the image display device according to the embodiment of the present invention.

FIG. 4 is a block diagram illustrating a functional configuration of the controller 200 included in the image display device 110. The image display device 110 is configured to include an OS (Operating System) 400, an application unit 410, a video signal input unit 422, and a coordinate sensor driver 424.

The video signal input unit 422 is functional means that processes a video signal transmitted by the user PC 130. Specifically, the video signal input unit 422 converts the video signal such as a VGA signal, which is received from the user PC 130, into a digital signal, and provides the application unit 410 with the digital signal.

The OS 400 is functional means that controls the whole controller 200. The OS 400 receives various kinds of events issued by the coordinate sensor driver 424 and notifies the application unit 410.

In this embodiment, an OS such as Windows (registered trademark) series, UNIX (registered trademark), Linux (registered trademark), TRON, ITRON, and µITRON may be employed as the OS 400. A processor (not illustrated) included in the controller 200 executes a program according to the present invention, which is written in a program language such as an assembler, C, C++, Java (registered trademark), JavaScript (registered trademark), Perl, Ruby, and Python, under the management of these OSs.

The coordinate sensor driver 424 is functional means that controls the coordinate sensor 114. When the coordinate sensor driver 424 receives a contact signal from the coordinate sensor 114, the coordinate sensor driver 424 issues an event (TOUCH), which indicates that the drawing device 210 contacts or approaches the display 112, an event (MOVE), which indicates that the drawing device 210 is in contact with the display 112 or close to the display 112 and the contact point or the close point is moved, or an event (RELEASE), which indicates that the drawing device 210 is separated off the display 112, and notifies the OS 400.

The coordinate sensor driver 424 uses identification information of the infrared light, which is received from the coordinate sensor 114, to specify the coordinate position of the drawing device 210, and add information indicative of the coordinate position (hereinafter referred to as "coordinate position information") to each event (TOUCH, MOVE, or RELEASE). Multiple portions of coordinate position information are added to the event (MOVE). The coordinate sensor driver 424 also uses the switching unit type signal received from the coordinate sensor 114 to determine the type of the mode switching unit 308 or 310 that is pressed by a user, and adds identification information of the mode switching unit to these events. In the case where the mode switching unit 308 or 310 is not pressed, or the case where the switching unit type signal is not received in other words, the coordinate sensor driver 424 does not add identification information of the mode switching unit to those events.

The application unit 410 is functional means that processes an image displayed on the display 112, and is configured to include a video signal processing unit 412, an event processing unit 414, a drawing unit 416, a deleting unit 418, and an operating unit 420.

The video signal processing unit 412 is functional means that processes a video signal provided by the video signal input unit 422. The video signal processing unit 412 generates a display image of the user PC 130 from the video signal, and displays the display image on the display 112. The video signal processing unit 412 stores the image displayed on the display 112 in the predetermined area (hereinafter referred to as "a background image storage area") in a storage unit such as a RAM included in the controller 200.

The event processing unit 414 is functional means that processes an event received from the OS 400. Specifically, the event processing unit 414 notifies the drawing unit 416, the deleting unit 418, and the operating unit 420, which handle a process corresponding to the event received from the OS 400, of the event (TOUCH), the event (MOVE), and the event (RELEASE).

The drawing unit 416 is functional means that generates a drawn image and displays the drawn image on the display 112. The drawing unit 416 changes the color of the coordinate position specified by the coordinate position information included in the event received from the event processing unit 414 into a specified color so as to generate the drawn image. Then, the drawing unit 416 obtains an image from the background image storage area, composes the image with the drawn image, and displays the composite image on the display 112.

The drawing unit 416 stores the drawn image displayed on the display 112 in a predetermined area (hereinafter referred to as "a drawn image storage area") in a storage unit such as a RAM included in the controller 200. At this time, the drawing unit 416 stores information indicative of coordinate positions that form the drawn image, as metadata for the drawn image, in the drawn image storage area. The drawing unit 416 also stores the composed image in a predetermined area (hereinafter referred to as "a composite image storage area").

The deleting unit 418 is functional means that deletes the drawn image. The deleting unit 418 compares the coordinate position specified by the coordinate position information included in the event received from the event processing unit 414 with the coordinate position where the drawn image is formed. In the case where these coordinate positions match each other, the deleting unit 418 changes the color of the coordinate position in the composite image into the color of the corresponding background image. Then, the deleting unit 418 displays the modified composite image on the display 112 and stores it in the composite image storage area.

In this embodiment, the color of the pixel in each coordinate position, which constitutes these images, is stored in the background image storage area and the composite image storage area. The deleting unit 418 is able to specify a pixel of the composite image that corresponds to the drawn image to be deleted, and specify the color of the background image, which corresponds to this pixel.

The operating unit 420 is functional means that instructs the image display device 110 or the user PC 130 to operate. The operating unit 420 determines whether or not the coordinate position, which is specified by the coordinate position information included in the event received from the event processing unit 414, is in the area of the image object, which indicates an instruction to the image display device 110, or in the area where a display image of the user PC 130 is displayed.

In the case where the coordinate position specified by the coordinate position information is in the area of the image object that indicates an instruction to the image display device 110, the operating unit 420 issues an event, which indicates that the image object is selected, to the OS 400. In the case where the coordinate position specified by the coordinate position information is in the area where the display image of the user PC 130 is displayed, the operating unit 420 changes the coordinate position into a coordinate position that fits the resolution of the display image of the user PC 130, and transmits an input device event with the changed coordinate position to the user PC 130.

In this embodiment, the image display device 110 includes functional means that controls the coordinate sensor 114, and functional means that generates the drawn image and superimposes the drawn image on a background image. This eliminates the need to install software such as a control driver, which has these functions, on the user PC 130.

Figure 5:
FIG. 5 is a flowchart illustrating a process executed by a controller included in the image display device according to the embodiment of the present invention.

FIG. 5 is a flowchart illustrating a process executed by the image display device according to the present invention. The process executed by the controller 200 in the image display device 110 will be described in detail below by referring to FIG. 5.

The process illustrated in FIG. 5 starts from the step S500. In step S501, whether or not the event processing unit 414 in the controller 200 detects an event issued by the coordinate sensor driver 424 is determined. In the case where the event is not detected (no), the process of step S501 is repeated. On the other hand, in the case where the event is detected (yes), the process proceeds to step S502.

In step S502, the event processing unit 414 uses identification information of the mode switching unit, which is added to the event, to determine whether or not the first button is pressed. The first button is used to specify the deletion mode. In the case where the event processing unit 414 determines that the first button is pressed (yes), the process proceeds to step S506. In step S506, the event processing unit 414 notifies the deleting unit 418 of the event detected in step S501, and the process returns to step S501.

On the other hand, in the case where the event processing unit 414 determines that the first button is not pressed in the determination of step S502 (no), the process proceeds to step S503. In step S503, the event processing unit 414 uses the identification information of the mode switching unit, which is added to the event, to determine whether or not the second button is pressed. The second button is used to specify the selection mode. In the case where the event processing unit 414 determines that the second button is pressed (yes), the process proceeds to step S505. In step S505, the event processing unit 414 notifies the operating unit 420 of the event detected in step S501, and the process returns to step S501.

On the other hand, in the case where the event processing unit 414 determines that the second button is not pressed in the determination of step S503 (no), the process proceeds to step S504. In step S504, the event processing unit 414 notifies the drawing unit 416 of the event detected in step S501, and the process returns to step S501.

Figure 6:
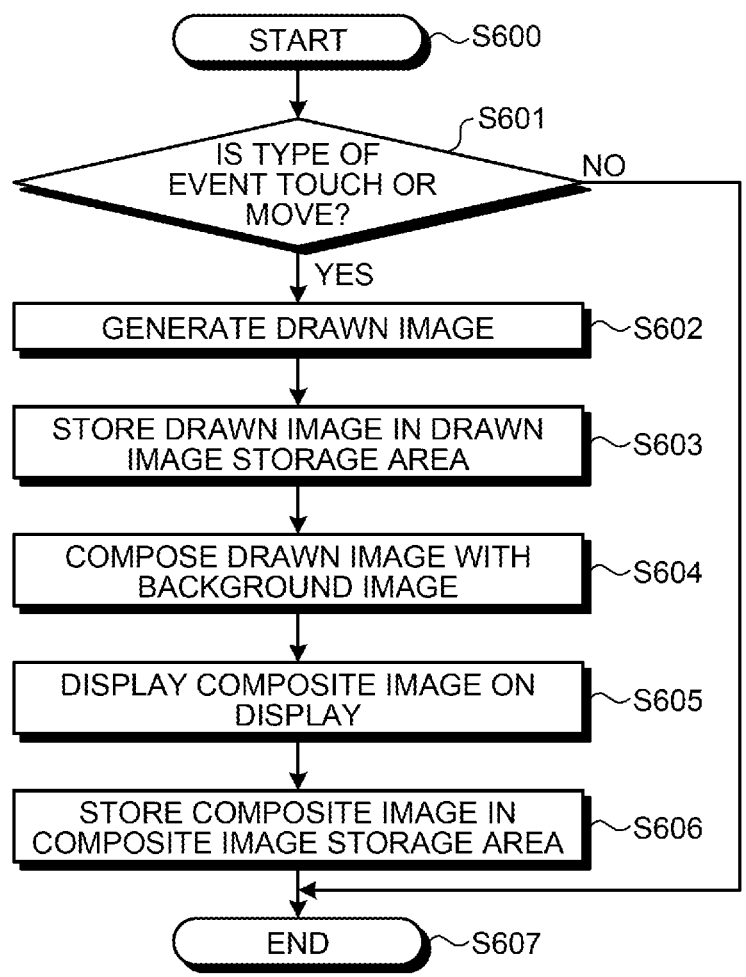
FIG. 6 is a flowchart illustrating a process executed by a controller included in the image display device according to the embodiment of the present invention, in the case where a drawing mode is selected.

FIG. 6 is a flowchart illustrating a process executed by the image display device according to the present invention. The process executed by the controller 200 in the image display device 110 in the case where the drawing mode is selected will be described in detail below by referring to FIG. 6.

The process illustrated in FIG. 6 starts when the drawing unit 416 receives an event from the event processing unit 414 in step S600. In step S601, the drawing unit 416 determines whether or not the type of the event is TOUCH or MOVE. In the case where the type of the event is TOUCH or MOVE (yes), the process proceeds to step S602. On the other hand, in the case where the type of the event is not TOUCH or MOVE, in other words, in the case where the type of the event is RELEASE (no), the process proceeds to step S607 and then ends.

In step S602, the drawing unit 416 uses coordinate position information, which is added to the event, to generate a drawn image. In step S603, the drawing unit 416 stores the drawn image in the drawn image storage area. In step S604, the drawing unit 416 obtains a background image from the background image storage area, and composes the background image with the drawn image. In step S605, the drawing unit 416 displays the composite image generated in step S604 on the display 112. In step S606, the drawing unit 416 stores the composite image in the composite image storage area. Then the process ends in step S607.

FIG. 7 is a flowchart illustrating a process executed by the image display device according to the present invention. The process executed by the controller 200 in the image display device 110 in the case where the deletion mode is selected will be described below by referring to FIG. 7.

The process illustrated in FIG. 7 starts when the deleting unit 418 receives an event from the event processing unit 414 in step S700. In step S701, the deleting unit 418 determines whether or not the type of the event is TOUCH or MOVE. In the case where the type of the event is TOUCH or MOVE (yes), the process proceeds to step S702. On the other hand, in the case where the type of the event is not TOUCH or MOVE, in other words, in the case where the type of the event is RELEASE (no), the process proceeds to step S707 and then ends.

In step S702, the deleting unit 418 obtains coordinate position information of a drawn image stored in the drawn image storage area. In step S703, the deleting unit 418 compares coordinate position information, which is added to the event, with the coordinate position information of the drawn image, in order to determine whether or not the coordinate positions specified by these coordinate position information overlap. In the case where the coordinate positions overlap (yes), the process proceeds to step S704. On the other hand, in the case where the coordinate positions do not overlap (no), the process proceeds to step S707 and then ends.

In step S704, the deleting unit 418 obtains a composite image from the composite image storage area. Then the deleting unit 418 changes the color of the pixel specified by the coordinate position in the composite image into the color of the pixel specified by the coordinate position in the background image stored in the background image storage area, so as to delete the drawn image specified by the coordinate position. In step S705, the deleting unit 418 displays the composite image modified in step S704 on the display 112. In step S706, the deleting unit 418 stores the composite image displayed on the display 112 in the composite image storage area. Then the process ends in S707.

FIG. 8 is a flowchart illustrating a process executed by the image display device according to the present invention. The process executed by the controller 200 in the image display device 110 in the case where the selection mode is selected will be described below by referring to FIG. 8.

The process illustrated in FIG. 8 starts when the operating unit 420 receives an event from the event processing unit 414 in step S800. In step S801, the operating unit 420 determines whether or not the type of the event is RELEASE. In the case where the type of the event is RELEASE (yes), the process proceeds to step S802. On the other hand, in the case where the type of the event is not RELEASE, in other words, in the case where the type of the event is TOUCH or MOVE (no), the process proceeds to step S806 and then ends.

In step S802, the operating unit 420 uses coordinate position information, which is added to the event, in order to determine to which area the coordinate position specified by the coordinate position information belongs. In the case where the coordinate position belongs to an image object area, the process proceeds to step S803. In step S803, the operating unit 420 issues an event, which indicates that the image object specified by the coordinate position is selected, to the OS 400. Then the process ends in S806.

In the case where the operating unit 420 determines that the coordinate position belongs to the display image area of the user PC 130 in the determination of step S802, the process proceeds to step S804. In step S804, the operating unit 420 changes the coordinate position, which is specified by the coordinate position information added to the event, to fit the resolution of the display image of the user PC 130. The resolution of the display image of the user PC 130 may be preliminarily specified. Alternatively, the video signal processing unit 412 may analyze video signals received from the user PC 130 to calculate the resolution.

In step S805, the operating unit 420 adds coordinate position information, which indicates the changed coordinate position, to an input device event, which indicates that the coordinate position is selected, and then transmits to the user PC 130. Then the process ends in step S806.

In the case where the operating unit 420 determines that the coordinate position belongs to another area in the determination of step S802, the process proceeds to step S806 and then ends.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

Especially in the above-described embodiment, the controller displays an image on a display that is configured integrally with the image display device. However, in other embodiments, the controller may allow a display device such as a projector, which can project an image, to project an image on a display surface such as a screen so as to display the image. In this case, a sensor that senses a contact position or a proximity position of a drawing device is disposed on the screen or the display device. The controller is able to obtain contact position information or proximity position information of the drawing device, which is relative to the area on the display surface on which the image is projected, namely, the display area of the display device, from the sensor.

The image display control device according to the preferred embodiment of the present invention employs the configuration described above and allows creating and deleting a drawn image and improving operability at the time of switching between functions provided by an image display control device.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (PAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:
1. A display device, comprising:
a first interface configured to receive a video signal of an externally-generated image generated and sent from an information processing apparatus that is external to the display device, the first interface being coupled to the information processing apparatus by a first cable;
a second interface configured to send, to the information processing apparatus, control signals based on a coordinate position of a drawing device, the second interface being coupled to the information processing apparatus by a second cable that is different from the first cable; and a controller including an operating system and configured to control all operations of the first interface and the second interface, the controller including circuitry configured to
- cause display of the externally-generated image based on the received video signal, the externally-generated image being displayed in a first display area of a display surface that is smaller than an entire area of the display surface;
- cause to be displayed, in a second display area of the display surface different from the first display area, user interface elements to control operations of the display device;
- acquire a contact signal based on a contact position of the drawing device;
- determine whether the contact position is in one of the first display area and the second display area;
- control operations of the information processing apparatus by transmitting the control signals to the information processing apparatus via the second interface, when the contact position of the drawing device is determined to be in the first display area; and
- control operations of the display device by sending an operating system control signal to the operating system of the display device, when the contact position of the drawing device is determined to be in the second display area having the user interface elements.

2. The display device according to claim 1, wherein the first interface includes a video graphics array (VGA) interface.

3. The display device according to claim 1, wherein the first interface includes a high-definition multimedia interface (HDMI) interface.

4. The display device according to claim 1, wherein when the contact position of the drawing device is in the first display area, the circuitry is further configured to generate the control signals based on the contact position and a resolution of the external image.

5. The display device of claim 1, wherein the circuitry is further configured to cause display of buttons or icons as the user interface elements used to control the operations of the display device.

6. The display device of claim 1, wherein the controller, the first interface, and the second interface are integrated into a single stand-alone device.

7. The display device of claim 1, wherein the circuitry is further configured to determine whether the contact position is in one of the first and second display areas, only when a particular button on the drawing device is engaged.

8. A method performed by a display device including a display, a first interface, a second interface, and a controller including an operating system and configured to control all operations of the first interface and the second interface, the controller including circuitry, wherein the first interface is configured to receive a video signal of an externally-generated image generated and sent from an information processing apparatus that is external to the display device, and the second interface is configured to send, to the information processing apparatus, control signals based on a coordinate position of a drawing device, the method comprising:
- displaying the externally-generated display image based on the received video signal received from the information processing apparatus through the first interface, the externally-generated image being displayed in a first display area of a display surface that is smaller than an entire area of the display surface, the first interface being coupled to the information processing apparatus by a first cable;
- displaying in a second display area of the display surface different from the first display area, user interface elements to control operations of the display device;
- acquiring a contact signal based on a contact position of the drawing device;
- determining whether the contact position is in one of the first display area and the second display area;
- controlling operations of the information processing apparatus by transmitting the control signals to the information processing apparatus via the second interface, when the contact position of the drawing device is determined to be in the first display area; and
- controlling operations of the display device by sending an operating system control signal to the operating system of the display device, when the contact position of the drawing device is determined to be in the second display area having the user interface elements.

9. The method according to claim 8, wherein the first interface includes a video graphics array (VGA) interface.

10. The method according to claim 8, wherein the first interface includes a high-definition multimedia interface (HDMI) interface.

11. The method according to claim 8, wherein when the contact position of the drawing device is in the first display area, the generating step comprises generating the control signals based on the contact position and a resolution of the external image.

12. The method of claim 8, wherein the displaying step further comprises displaying cause display of buttons or icons as the user interface elements used to control the operations of the display device.

13. A system, comprising:
a display device; and
an information processing apparatus external to the display device, wherein
the display device further includes a first interface configured to receive a video signal of an externally-generated image sent from the information processing apparatus, the first interface being coupled to the information processing apparatus by a first cable,
the display device further includes a second interface configured to send, to the information processing apparatus control signals based on a coordinate position of a drawing device, the second interface being coupled to the information processing apparatus by a second cable that is different from the first cable; and
the display device further includes a controller including an operating system and configured to control all operations of the first interface and the second interface, the controller including circuitry configured to
- cause display of the externally-generated image based on the received video signal, the externally-generated image being displayed in a first display area of a display surface that is smaller than an entire area of the display surface;
- cause to be displayed, in a second display area of the display surface different from the first display area, user interface elements to control operations of the display device;
- acquire a contact signal based on a contact position of the drawing device;
- determine whether the contact position is one of the first display area and the second display area;

control operations of the information processing apparatus by transmitting the control signals to the information processing apparatus via the second interface, when the contact position of the drawing device is determined to be in the first display area; and control operations of the display device by sending an operating system control signal to the operating system of the display device, when the contact position of the drawing device is determined to be in the second display area having the user interface elements.

14. The system according to claim 13, wherein the first interface includes a video graphics array (VGA) interface.

15. The system according to claim 13, wherein the first interface includes a high-definition multimedia interface (HDMI) interface.

16. The system according to claim 13, wherein when the contact position of the drawing device is in the first display area, the circuitry is further configured to generate the coordinate control signals based on the contact position and a resolution of the external image.

17. The system of claim 13, wherein the circuitry is further configured to cause display of buttons or icons as the user interface elements used to control the operations of the display device.

18. The system of claim 13, wherein the circuitry is further configured to generate a drawn image based on the contact signal, and display the drawn image without sending any information regarding the drawn image to the information processing apparatus.

19. The system of claim 13, wherein the circuitry is further configured to display an entirety of contents of a display screen concurrently displayed on a display of the information processing apparatus.

* * * * *